US012790133B2

(12) United States Patent
Stoeckl et al.

(10) Patent No.: US 12,790,133 B2
(45) Date of Patent: Nov. 10, 2026

(54) APPARATUS FOR GUIDING CONTAINERS, AND STAR WHEEL CONVEYOR

(71) Applicant: KRONES AG, Neutraubling (DE)

(72) Inventors: Fabian Stoeckl, Neutraubling (DE); Daniel Mohr, Neutraubling (DE); Markus Schoenfelder, Neutraubling (DE); Tobias Ehrismann, Neutraubling (DE); Bruno Landler, Neutraubling (DE)

(73) Assignee: KRONES AG, Neutraubling (DE)

( * ) Notice: Subject to any disclaimer, the term of this patent is extended or adjusted under 35 U.S.C. 154(b) by 125 days.

(21) Appl. No.: 18/897,524

(22) Filed: Sep. 26, 2024

(65) Prior Publication Data

US 2025/0100813 A1 Mar. 27, 2025

(30) Foreign Application Priority Data

Sep. 27, 2023 (DE) ..................... 10 2023 126 252.1

(51) Int. Cl.
*B65G 47/84* (2006.01)
*B65G 21/20* (2006.01)

(52) U.S. Cl.
CPC ....... *B65G 47/846* (2013.01); *B65G 21/2072* (2013.01); *B65G 2201/0235* (2013.01)

(58) Field of Classification Search
CPC .............. B65G 47/846; B65G 21/2072; B65G 2201/0235; B65G 29/00
USPC ........................................... 198/836.4, 459.2
See application file for complete search history.

(56) References Cited

U.S. PATENT DOCUMENTS 7,967,127 B2 * 6/2011 Spence ................ B65G 47/847 198/723
8,418,836 B2 4/2013 Papsdorf
8,499,921 B1 * 8/2013 Orndorff ................ B65G 29/00 198/479.1

(Continued)

FOREIGN PATENT DOCUMENTS

DE 10 2020 111 855 A1 11/2021
EP 2093169 A1 8/2009

(Continued)

OTHER PUBLICATIONS

Search Report dated Jun. 3, 2024, from German Application No. 10 2023 126 252.1, 6 pages.

*Primary Examiner* — Mark A Deuble
(74) *Attorney, Agent, or Firm* — Haynes and Boone, LLP

(57) ABSTRACT

An apparatus for guiding containers conveyed by a star wheel in a star wheel conveyor, for example for guiding beverage containers in a star wheel conveyor in a beverage filling plant, includes at least two adjustment parts arranged spaced apart from one another in a circumferential direction relative to a central axis, each displaceable in the radial direction relative to the central axis, and a control segment displaceable in the circumferential direction, which is coupled to the adjustment parts such that displacement of the control segment in the circumferential direction causes a displacement of the adjustment parts in the radial direction, wherein a guide rail segment is arranged at the radially inner end of each adjustment part, and wherein the guide rail segments together form a segmented guide rail for providing an outer guide track for the containers to be conveyed.

20 Claims, 7 Drawing Sheets

(56) References Cited

U.S. PATENT DOCUMENTS

| | | | | | |
|---|---|---|---|---|---|
| 9,670,001 | B2 * | 6/2017 | Doherty | B65G 21/2072 | |
| 9,731,910 | B2 * | 8/2017 | Bruch | B65G 21/2072 | |
| 10,829,315 | B2 * | 11/2020 | Kakitani | B30B 15/32 | |
| 2009/0014286 | A1 * | 1/2009 | Robertson | B65G 21/2072 | 198/836.3 |
| 2011/0127143 | A1 * | 6/2011 | Calzolari | B65G 47/847 | 198/618 |
| 2023/0080353 | A1 * | 3/2023 | Dodd | B65G 21/2072 | 198/469.1 |

FOREIGN PATENT DOCUMENTS

| | | | |
|---|---|---|---|
| EP | 3042869 | A1 | 7/2016 |
| EP | 3152138 | B1 | 2/2019 |
| WO | WO 2005 030 616 | A2 | 4/2005 |

* cited by examiner

APPARATUS FOR GUIDING CONTAINERS, AND STAR WHEEL CONVEYOR

CROSS-REFERENCE TO RELATED APPLICATIONS

This application claims priority from German Patent Application No. DE 10 2023 126 252.1, filed on Sep. 27, 2023 in the German Patent and Trademark Office, the disclosure of which is incorporated herein by reference in its entirety.

BACKGROUND

Technical Field

The present invention relates to an apparatus for guiding containers conveyed by a star wheel in a star wheel conveyor and to a star wheel conveyor for conveying containers.

Related Art

Star wheel conveyors are usually used on automated processing lines in beverage filling systems, e.g., at the end of a production line, to separate filled and closed containers at a given rate.

In order to be able to specify the rate, i.e., the frequency of transferring the containers or the distance between two consecutive containers, star wheel conveyors comprise a plurality of container receptacles, evenly distributed around the circumference of a conveyor wheel, in which the containers to be conveyed are received during conveyance by the star wheel conveyor.

In principle, two fundamentally different types of star wheel conveyors can be distinguished with regard to the nature of their container holders, viz., comprising, on the one hand, container holders in the form of clamps and, on the other, in the form of pockets.

The first type of star wheel conveyors have container holders which can be configured as active or passive clamps. These clamps grip the container to be conveyed by actively or passively pivoting two clamp arms that can be pivoted relative to one another between an open position and a closed position during the conveying operation of the star wheel conveyor, i.e., during conveyance of containers to be conveyed, when the container is taken over and when the container is handed over. The open position allows the container to be held to be inserted into the clamp and removed from the clamp. In the closed position, the clamp fixes the container in a given position in the clamp so that conveyance is possible. The container is held in position by being gripped via the clamp on the star wheel conveyor. The transition between the open position and the closed position of the clamp arms takes place either actively, i.e., controlled by an appropriate controller apparatus, or passively, by pushing the container into the clamp against a bias of the clamp arms. Accordingly, during the conveying operation of the star wheel conveyor, when the container to be conveyed is taken over from an apparatus upstream of the star wheel conveyor in the conveying direction of the container in the system into the clamp and also when the container conveyed by the star wheel conveyor is transferred from the clamp to an apparatus downstream of the star wheel conveyor, a clamp experiences a change in the position of its clamp arms-during the takeover at least from the open position to the closed position, and during the transfer from the closed position to the open position.

Such a conveyor, which is formed with clamps for gripping a container, can be found, for example, in EP 2 093 169 A1. This disclosure deals in particular with the second group of star wheel conveyors, which do not include clamps, but pockets. “Pockets” are here understood to mean container holders which, in contrast to the clamps described above, do not experience any movement between different positions during the conveying operation of the star wheel conveyor. On the contrary, the pockets are preset in a setup process and remain in a rigid, fixed position during the actual operation of the star wheel conveyor and the latter’s comprehensive filling system. The pockets therefore provide a receiving space that remains constant during the conveying operation, in which space a container is at least partially received for conveyance without being gripped by position changes of clamp arms, as is the case with clamps.

In order to enable a container to be conveyed in the conveying direction, the pocket comprises a rear pocket arm, as viewed in the conveying direction, which pushes the container to be conveyed from behind, as viewed in the conveying direction, when the conveyor wheel comprising the pocket rotates in the conveying direction. The container, possibly in cooperation with a guide provided radially on the outside with respect to the axis of rotation of the conveyor wheel, either is pushed over a rigid base plate of the star wheel conveyor, or the star wheel conveyor comprises a rotating base plate on which the conveyed container stands with its container base. To restrict the pocket at the front as seen in the conveying direction, the pocket can comprise an additional pocket arm.

Star wheel conveyors are widely used, with, substantially, a disk-shaped conveyor wheel with a plurality of pockets provided around the circumference, which are evenly spaced from one another. The conveyor wheel of such star wheel conveyors typically comprises at least one pair of disk-like plates which, in a changeover mode, can be rotated relative to one another about a central axis of rotation of the conveyor wheel. Rigid, radially outward-facing projections are arranged on the plates, each of which forms a pocket arm of a pocket. The projections of the one plate always form the pocket arm on one side of each pocket, e.g., always the rear pocket arm, and the projections of the other plate then always form the pocket arm on the other side of each pocket—for example, always the front pocket arm. By rotating the plates relative to each other, a width can be preset in the changeover mode. Such an apparatus can be found in EP 3 152 138 B1.

Furthermore, WO 2005/030616 A2 discloses an apparatus in which pocket arms are pivotably arranged on a pair of disks of a conveyor wheel via gear transmissions.

In order to prevent the containers conveyed in the pockets from moving out of the pockets during conveyance, an apparatus for guiding containers is usually arranged opposite the pockets on an outer side of a star wheel conveyor, also referred to as a container outer guide, which comprises a circular-arc-shaped guide rail arranged on a given pitch circle with respect to the axis of rotation of the rotary conveyor comprising the pockets. Apparatuses are known for which the distance between the guide rail and the axis of rotation can be changed. Such an apparatus is disclosed, for example, in U.S. Pat. No. 8,418,836 B2. With this apparatus, a flexible guide rail can be deformed in order to provide more or less an approximately circular arc shape at different radii of the guide rail relative to the axis of rotation.

SUMMARY

An improved apparatus for guiding containers conveyed by a star wheel in a star wheel conveyor, for example for guiding beverage containers in a star wheel conveyor in a beverage filling plant, as well as an improved star wheel conveyor is described herein according to various embodiments.

Accordingly, what is proposed is an apparatus for guiding containers conveyed by a star wheel in a star wheel conveyor on a radially outer side relative to the star wheel, for example for guiding beverage containers in a star wheel conveyor in a beverage filling plant, comprising a plurality of adjustment parts arranged spaced apart from one another in a circumferential direction relative to a central axis, each displaceable in the radial direction relative to the central axis, and a control segment displaceable in the circumferential direction, which is coupled to the adjustment parts such that displacement of the control segment in the circumferential direction causes a displacement of the adjustment parts in the radial direction.

A guide rail segment is arranged at each radially inner end of the adjustment parts, wherein the guide rail segments together form a segmented guide rail for providing a guide track for containers to be conveyed.

This allows the guide rail to be arranged on different radii or pitch circle diameters relative to a central axis of rotation of the star wheel conveyor without the guide rail or its guide rail segments necessarily having to be elastically or even plastically deformed. Accordingly, the apparatus does not have to absorb any forces and stresses that compensate for restoring forces due to elastic deformation of the guide rail. Accordingly, the forces required to adjust the positions of the guide rail segments can also be low compared to conventional apparatuses from the prior art. The proposed apparatus can thus be configured to be compact, with comparatively little use of material, can have a simple structure, and can be used over a comparatively long service life without damage to parts of the apparatus occurring.

The central axis can be the central axis of rotation of a star wheel of a star wheel conveyor comprising a plurality of pockets for holding a container.

The segmented guide rail can be at least in part substantially arc-shaped, or, optionally, circular-arc-shaped. In other words, the guide rail segments can be arranged relative to one another such that the segmented guide rail has a substantially arc-like shape which substantially corresponds to the trajectory of the containers, conveyed and guided through the apparatus, as defined by the star wheel of the star wheel conveyor which encompasses the pockets.

The term “substantially arc-shaped” means that the individual guide rail segments, more specifically a guide surface of the individual guide rail segments, can have a fixed curvature radius that is different from the curvature of the arc shape along which the segmented guide rail extends. Nevertheless, the segmented guide rail can provide a guide track for the containers to be conveyed which has only negligible unevenness in its course with respect to a radius of the guide track relative to the central axis.

The guide rail can be a continuous, segmented guide rail. In other words, there may be no gap or distance between adjacent guide rail segments in the circumferential direction relative to the central axis, i.e., along the guide track provided by the segmented guide rail.

According to one embodiment, adjacent guide rail segments can overlap in the circumferential direction. This can, for example, ensure that the segmented guide rail is continuous, i.e., that there are no gaps between adjacent guide rail segments. Moreover, the overlapping parts of adjacent guide rail segments can be used to couple these guide rail segments.

According to one embodiment, by displacing the adjustment parts, the segmented guide rail can be movable relative to the central axis between a given radially inner position and a given radially outer position.

In the radially inner position, the segmented guide rail can be disposed substantially on an inner radius with respect to the central axis, and, in the radially outer position, the segmented guide rail can be disposed substantially on an outer radius that is greater than the inner radius.

In order to allow for stable guidance of the containers along the guide track provided by the segmented guide rail, the guide rail segments can be arranged on their associated adjustment part in a rotationally fixed manner at least about an axis defined by the radial direction.

Alternatively or additionally, the guide rail segments can be arranged so as to be non-displaceable at least in the circumferential direction relative to the central axis.

Here, the expression “in a rotationally fixed manner” means that a component is secured against rotation relative to the part on which it is arranged. The component thus cannot rotate relative to the part to which it is attached “in a rotationally fixed manner.” If “in a rotationally fixed manner” refers to a specific geometric axis, the component in question is not rotatable at least in relation to that axis. If no axis is explicitly specified, i.e., if a specific axis has not been indicated, the part is generally considered to be non-rotatable. This means that no rotational movement of the component relative to the part to which it is attached “in a rotationally fixed manner” is possible. This means that the component has no rotational degree of freedom relative to that part.

Analogously, “non-displaceable” means that a component is fixed against displacement relative to a further part, i.e., it has no translational degree of freedom.

An arrangement of a component described as being “non-displaceable and non-rotatable” thus corresponds to a rigid attachment without any degrees of freedom.

According to one embodiment, the guide rail segments can be configured to be displaceable relative to one another—for example, at least in the circumferential direction. It has proven to be advantageous if, optionally, when the adjustment parts are displaced in the radial direction, the guide rail segments undergo, among other things, a displacement relative to one another in a direction parallel to the circumferential direction.

According to one embodiment, at least two guide rail segments adjacent in the circumferential direction can be coupled to one another—for example, coupled so as to be displaceable. For example, they can be coupled so as to be displaceable in the circumferential direction. Coupling can be such that a spring element arranged on one of the coupled guide rail segments, e.g., configured as a guide pin, engages with a groove element which can be configured, for example, as a slot groove and which is arranged on the other of the coupled guide rail segments and extends, for example, in a displacement direction—for example, the circumferential direction. In particular, if it is provided for several or even all guide rail segments to be each coupled to their adjacent guide rail segments, each guide rail segment can have a spring element on a first side in the circumferential direction relative to the central axis and can have a groove element on the other side. On the one hand, all guide rail segments can thus be constructed in the same way. On the other hand, all guide rail segments can thus be coupled to their neighbors in the circumferential direction.

According to one embodiment, the guide rail segments can have a given curvature on their radially inner side. A curvature radius of the radially inner side can correspond to the radius of the radially outer position referred to above as the "second radius." Alternatively, the curvature radius can also correspond to another radius, such as that of the radially inner position or the radius of a position between the radially inner position and the radially outer position—for example, a radially central position which is central relative thereto.

According to one embodiment, the adjustment parts can each be guided on a guide element arranged on the control segment. The guide element can provide a guide curve between a first point located on a first radius with respect to the central axis and a second point located on a second radius smaller than the first radius and offset from the first point in the circumferential direction. Optionally, the guide element can comprise or be configured as a key or guide groove.

According to one embodiment, the key of the guide element can comprise a width which is perpendicular to the guide curve and increases from the first point to the second point. The key can, for example, be configured so that the base sides of the trapezoid lie at the first point and the second point, and the legs extend along the guide curve, i.e., between the first point and the second point. Alternatively or additionally, the key can be configured to be arc-shaped. Furthermore, alternatively or additionally, the key can engage with a corresponding groove arranged on the adjustment part, wherein the groove can optionally comprise side surfaces that are curved outwards with respect to the adjustment part, i.e., convex side surfaces with respect to the adjustment part.

According to one embodiment, the adjustment parts can be mounted on a base body so that they can be displaced in the radial direction—for example, they can be mounted so that they can be displaced, but cannot rotate about an axis defined by the radial direction.

Alternatively or additionally, the control segment can be mounted on the base body so that it can be displaced in the circumferential direction.

According to one embodiment, the adjustment parts can be configured to be telescopic. In one possible embodiment, the adjustment parts can each comprise a radially outer adjustment part portion and a radially inner adjustment part portion, wherein the adjustment part portions are displaceable relative to one another in the radial direction, wherein, for example, the guide rail segment is arranged on the radially inner adjustment part portion. The adjustment parts can be configured such that, by displacing the control segment in the circumferential direction, the radially inner adjustment part portion is displaced in the radial direction. The adjustment part portions can optionally be configured to be non-rotatable relative to one another with respect to an axis defined by the radial direction. The adjustment part portions can thus be secured against rotation relative to each other about the radial direction or the axis defined by said direction.

According to one embodiment, the apparatus can comprise a coupling mechanism for coupling to a further apparatus, arranged adjacently in the circumferential direction, for guiding containers conveyed by a star wheel in a star wheel conveyor. The coupling mechanism can be configured to couple the control segment of the apparatus to the further control segment of the further apparatus, so that the coupled control segments can be displaced together in the circumferential direction.

The coupling mechanism can comprise a coupling rod, wherein the coupling mechanism comprises, for example, a first rod, coupled to the control segment, with a thread of the first direction of rotation, which is coupled via a connecting nut to a second rod with a thread of the second direction of rotation, which is oriented opposite to the first direction of rotation, wherein the second rod is configured to be coupled to the further control segment of the further apparatus. In this way, two apparatuses can be easily arranged one behind the other in the circumferential direction in order to suitably increase a total guide track length for the containers provided by the combined apparatuses, wherein, by coupling the control segments via the coupling mechanism, only one actuating unit for controlling the position of only one of the control segments needs to be provided to move all control segments simultaneously.

According to one embodiment, the apparatus can comprise an actuating unit for adjusting the position of the control segment relative to the adjustment parts, wherein, for example, the actuating unit and the control segment can be in engagement via a toothing. The actuating unit can optionally comprise a manually operated drive and/or an automatic drive—for example, an electric motor.

According to one embodiment, the apparatus can comprise a height adjustment apparatus for adjusting a height position of the apparatus. The actuating unit can, for example, comprise a shaft element that is displaceable relative to a drive pinion of the actuating unit along the vertically oriented axis of rotation of the drive pinion and is connected in a rotationally fixed manner to the drive pinion.

A star wheel conveyor for conveying containers, for example for conveying beverage containers in a beverage filling plant, is described herein according to various embodiments.

Accordingly, a star wheel conveyor for conveying containers, e.g., for conveying beverage containers in a beverage filling plant, is proposed, comprising a conveyor wheel part rotatable about an axis of rotation with a plurality of pockets directed outwards with respect to the central axis for at least partially receiving a container to be conveyed, and at least one apparatus according to any of the preceding embodiments.

The central axis constitutes an axis of rotation of the conveyor wheel part or coincides therewith.

The advantages and effects of the apparatus described in this document also apply analogously to the star wheel conveyor, and vice versa. A repeated description of them is therefore omitted in order to avoid redundancies.

According to one embodiment, a plurality of apparatuses can be arranged next to one another in the circumferential direction with respect to the axis of rotation. The control segments of adjacent apparatuses can optionally be coupled to each other. Alternatively or additionally, the outer guide rail segments of adjacent apparatuses, viewed in the circumferential direction, can be coupled to one another.

BRIEF DESCRIPTION OF THE FIGURES

Further embodiments of the invention are explained in more detail by the following description of the figures.

DETAILED DESCRIPTION

Exemplary embodiments are described below with reference to the figures. Identical, similar, or identically acting elements are provided with identical reference signs in the various figures, and a repeated description of these elements is in some cases omitted in order to avoid redundancies.

Figure 1:
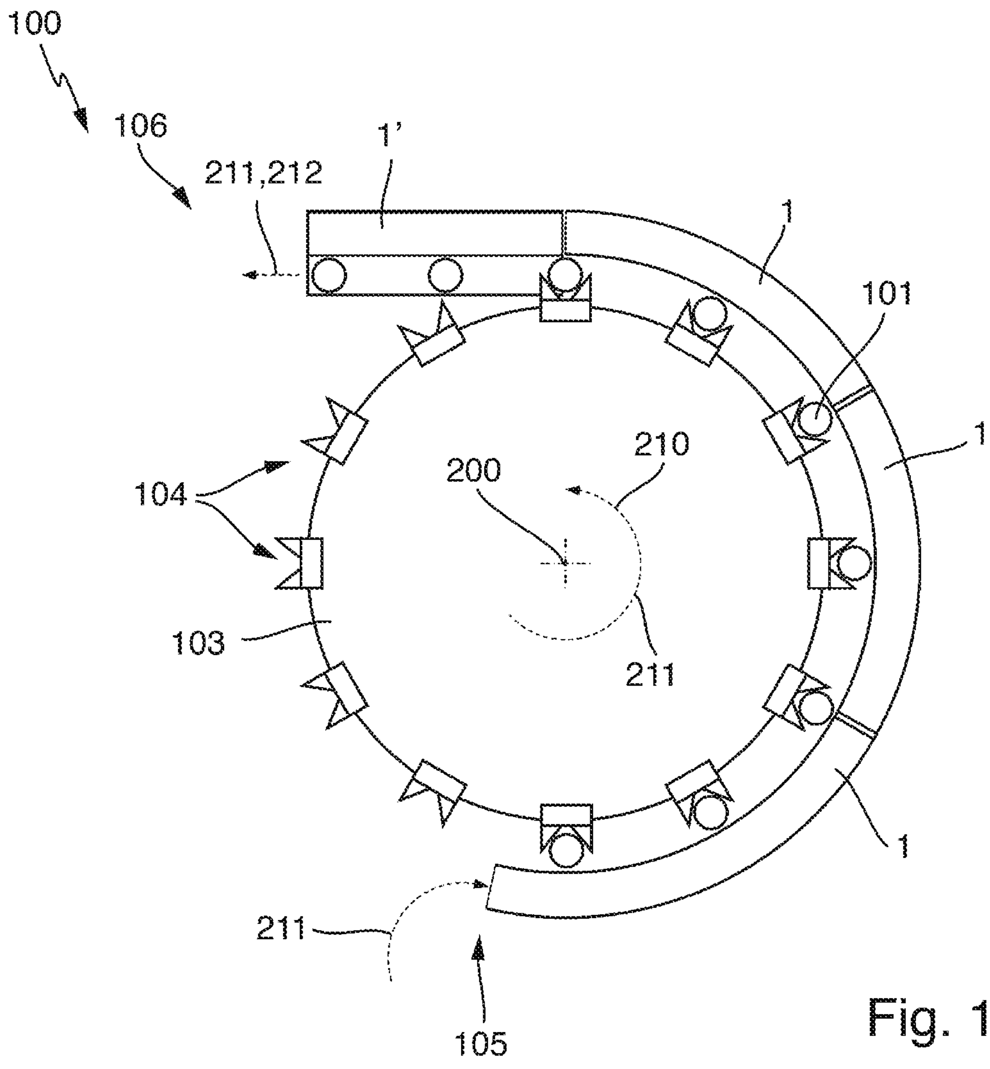
FIG. 1 schematically shows a top view of a star wheel conveyor for conveying containers in a beverage filling plant.

FIG. 1 schematically shows a top view of a star wheel conveyor 100 for conveying containers 101 in a beverage filling plant (not shown). The star wheel conveyor 100 comprises a conveyor wheel part 103 which is rotatable about a central axis 200 and has a plurality of pockets 104 arranged on its circumference and directed radially outwards with respect to the central axis 200 for at least partially receiving one of the containers 101 to be conveyed.

With respect to the central axis 200, radially outside the conveyor wheel part 103, a plurality of apparatuses 1, 1' for guiding the containers 101 conveyed by the conveyor wheel part 103, which represents a star wheel, in the star wheel conveyor 100 are arranged over a predetermined angular section with respect to the central axis 200.

The plurality of apparatuses 1, l' are each configured to guide the containers 101 on a radially outer side relative to the star wheel part 103, and each and together constitute a container outer guide 110 for guiding the containers 101 on a radially outer side relative to the star wheel part 103. In other words, the apparatuses 1, 1' constitute an outer guide for the containers 101.

The plurality of apparatuses 1, 1' are arranged next to one another or one after the other in relation to the central axis 200 in the conveying direction 211 of the containers 101 and are each coupled to one another via a coupling mechanism 2, which will be explained in more detail below.

The apparatuses 1 are substantially identical in construction. Each of the apparatuses 1 comprises a plurality of guide rail segments 4 arranged in a row in the circumferential direction 210, i.e., next to one another or one after the other (see FIG. 2). Furthermore, the star wheel conveyor 100 comprises an apparatus 1', the structure of which substantially corresponds to that of apparatuses 1, wherein the guide rail segments thereof are not arranged in the circumferential direction 210, but in a direction 212 tangential to the central axis 200.

Guide rail segments 4, which are adjacent when viewed in the conveying direction 211 or in the circumferential direction 210, partially overlap each other, as will be explained in more detail below. The outer guide rail segments 4 of adjacent apparatuses 1, l' are also coupled to each other.

The guide rail segments 4 form a segmented guide rail 6 for providing a guide track for containers 101 to be conveyed, along which the containers 101 are conveyed in the conveying direction 211.

Containers 101 to be conveyed are fed to the star wheel conveyor 100 at a container feed 105. Containers 101 conveyed by the star wheel conveyor 100 are transferred at a container transfer point 106 to a device (not shown) of the beverage filling plant that is located downstream of the star wheel conveyor 100 in the conveying direction 211.

Since the guide rail segments 4 of the apparatuses 1 are arranged in the circumferential direction 210, their segmented guide rails 6 are each arc-shaped. The segmented guide rail 6 of the apparatus 1' has a linear shape. The assembled segmented guide rail 6, composed of the guide rails 6 of all apparatuses 1, 1', is thus partly circular and partly linear.

Figure 2:
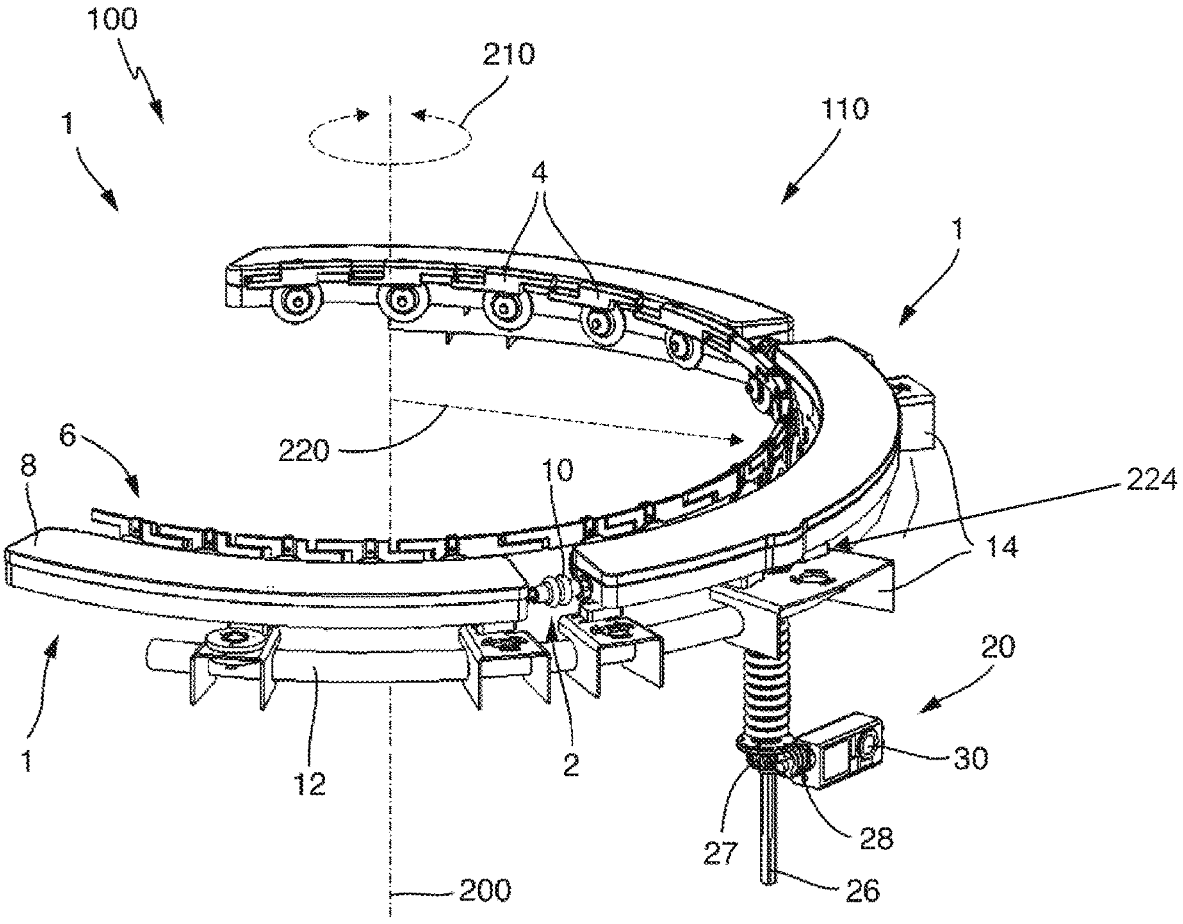
FIG. 2 schematically shows a perspectival side view of a portion of the star wheel conveyor of FIG. 1.

FIG. 2 schematically shows a perspectival side view of the apparatuses 1 of the star wheel conveyor 100 of FIG. 1.

The guide rail segments 4 are movable perpendicularly to the provided guide track so that their position relative to the central axis 200 can be changed. The guide rail segments 4 of the apparatuses 1 can each be changed in their position in the radial direction 220 relative to the central axis 200.

Each apparatus 1 comprises a housing 8 in which most of the components required for moving the guide rail segments 4 are housed. The coupling mechanism 2 for coupling two adjacent apparatuses 1, l' extends between two adjacent apparatuses 1, 1'. It comprises a seal for sealing against the environment, configured in the present case as a bellows 10 attached to both coupled apparatuses 1, 1'.

The housings 8 are arranged on a frame 12, which is connected at given connecting regions 14 to a height adjustment apparatus 224. With the height adjustment apparatus 224, a height level of the segmented guide rail 6 can be changed in a direction parallel to the central axis 200. A higher height level compared to an initial level corresponds to a displacement from the initial level against the direction of gravity.

Figure 3:
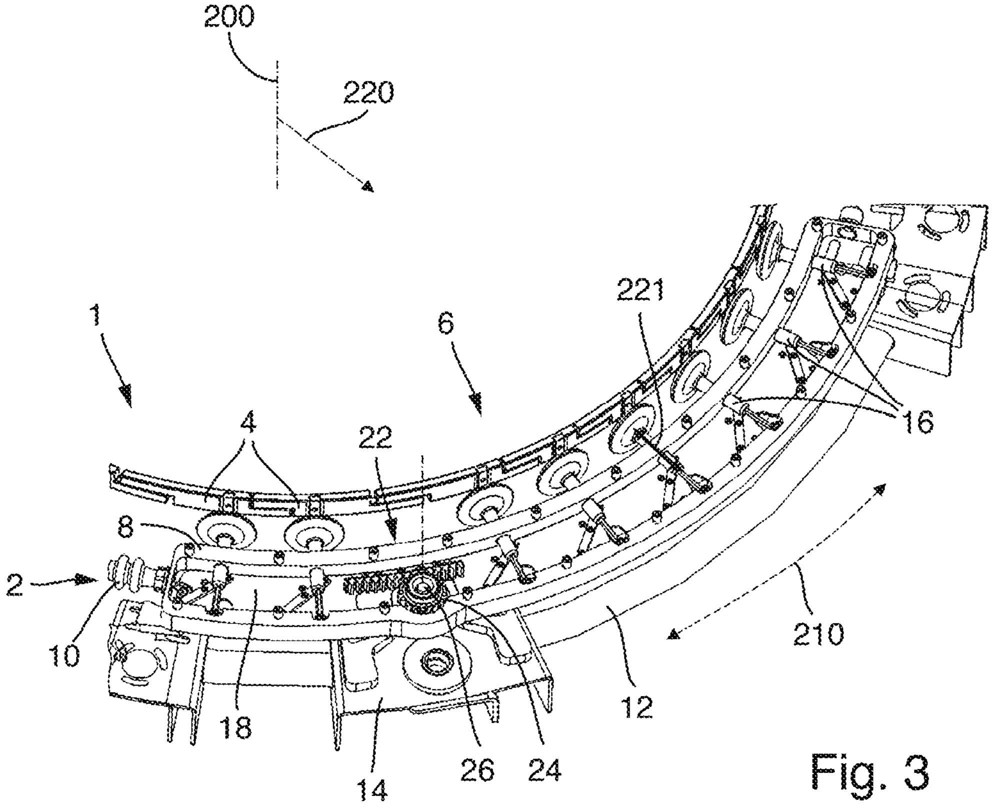
FIG. 3 schematically shows a perspectival side view of an apparatus for guiding containers conveyed by the star wheel conveyor of FIG. 1.

FIG. 3 shows an apparatus 1 of the star wheel conveyor of FIGS. 1 and 2 with the upper side of the housing hidden.

The apparatus 1 comprises a plurality of adjustment parts 16 arranged at a distance from one another in the circumferential direction 210 with respect to the central axis 200 and each displaceable in the radial direction with respect to the central axis 200, and a control segment 18 displaceable in the circumferential direction 210, which is coupled to the adjustment parts 16 such that a displacement of the control segment 18 in the circumferential direction 210 causes the adjustment parts 16 to be displaced in the radial direction 220.

The direction of displacement of one of the adjustment parts 16 is indicated by the movement arrow with reference sign 221.

A guide rail segment 4 is arranged at the radially inner end of each adjustment part 16.

By displacing the adjustment parts 16, the segmented guide rail 6 can be moved relative to the central axis 200 between a given radially inner position and a given radially outer position.

According to this optional embodiment, in the radially inner position, the segmented guide rail 6 lies substantially on an inner radius with respect to the central axis 200. In the radially outer position, the segmented guide rail 6 lies substantially on an outer radius which is larger than the inner radius. FIG. 3 shows the segmented guide rail 6 in the radially inner position.

In the present case, the guide rail segments 4 are arranged on their associated adjustment part 16 in a rotationally fixed and non-displaceable manner. For example, they can be screwed, glued, and/or welded.

As can be seen in FIG. 2, at least one apparatus 1 comprises an actuating unit 20 for adjusting the position of the control segment 18 relative to the adjustment parts 16. The actuating unit 20 and the control segment 18 are engaged via a toothing 22 (see FIG. 3). A gear 24 of the toothing 22 can be driven via a shaft element 26.

As can be seen again in FIG. 2, the shaft element 26 is coupled in a rotationally fixed manner to a drive pinion 27, which in turn meshes with a drive worm 28 of an automatic drive 30 of the actuating unit 20—here, optionally configured as an electric motor.

The drive 30 is provided at a fixed height position. In order to allow for different height levels of the segmented guide rail 6, the shaft element 26 is displaceable relative to the drive pinion 27 in the longitudinal direction of the shaft element 26.

Figure 4:
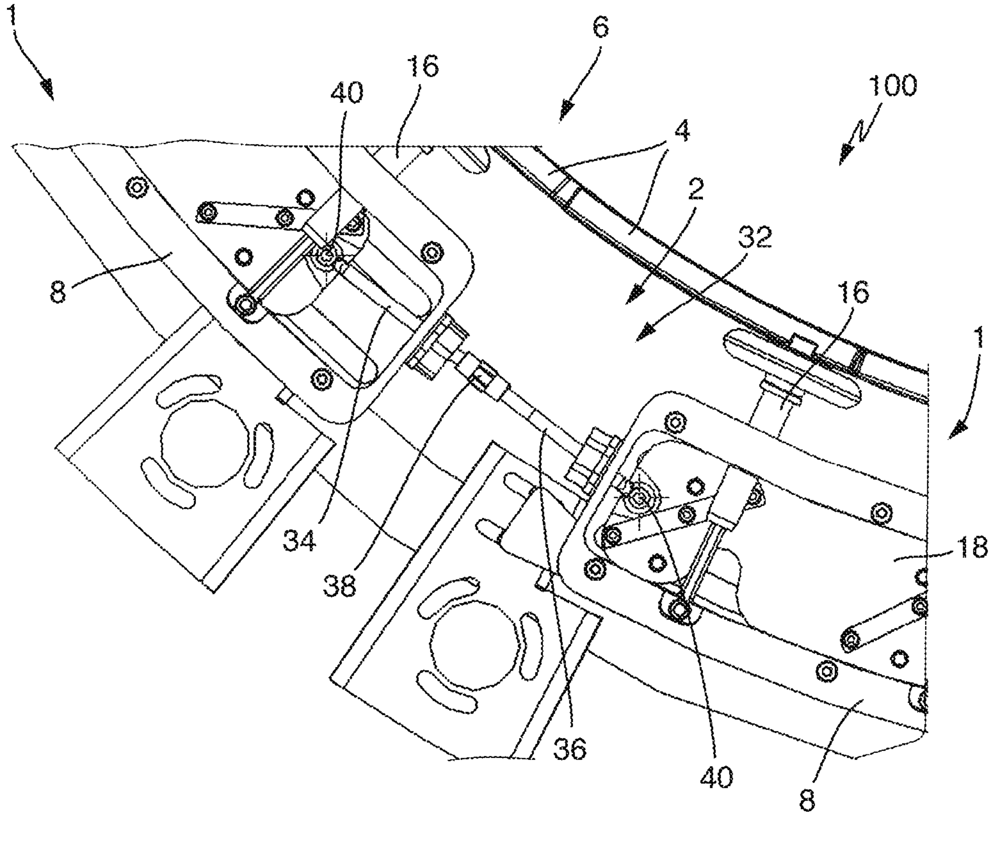
FIG. 4 schematically shows a top view of a coupling mechanism for coupling two apparatuses of the star wheel conveyor of FIG. 1 that are arranged adjacently to one another in the circumferential direction.

FIG. 4 schematically shows a top view in the direction of the central axis 200 onto one of the coupling mechanisms 2 for coupling two apparatuses 1 arranged adjacently in the circumferential direction 210, wherein the bellows 10 is hidden.

The coupling mechanism 2 is configured to couple the control segment 18 of an apparatus 1 to the further control segment 18 of a further apparatus 1, so that the coupled control segments 18 can be displaced together in the circumferential direction 210.

According to this optional embodiment, the coupling mechanism 2 comprises a coupling rod 32 which comprises a first rod 34 coupled to the one control segment 18 with a thread of a first direction of rotation and a second rod 36 coupled to the other control segment 18 with a thread of a second direction of rotation which is oriented opposite to the first direction of rotation. The two rods 34, 36 point towards each other with their threaded ends and are coupled to one another via a connecting nut 38.

The rods 34, 36 are each rotatably mounted on their respective control segment 18 about an axis 40 oriented parallel to the central axis 200.

Figure 5:
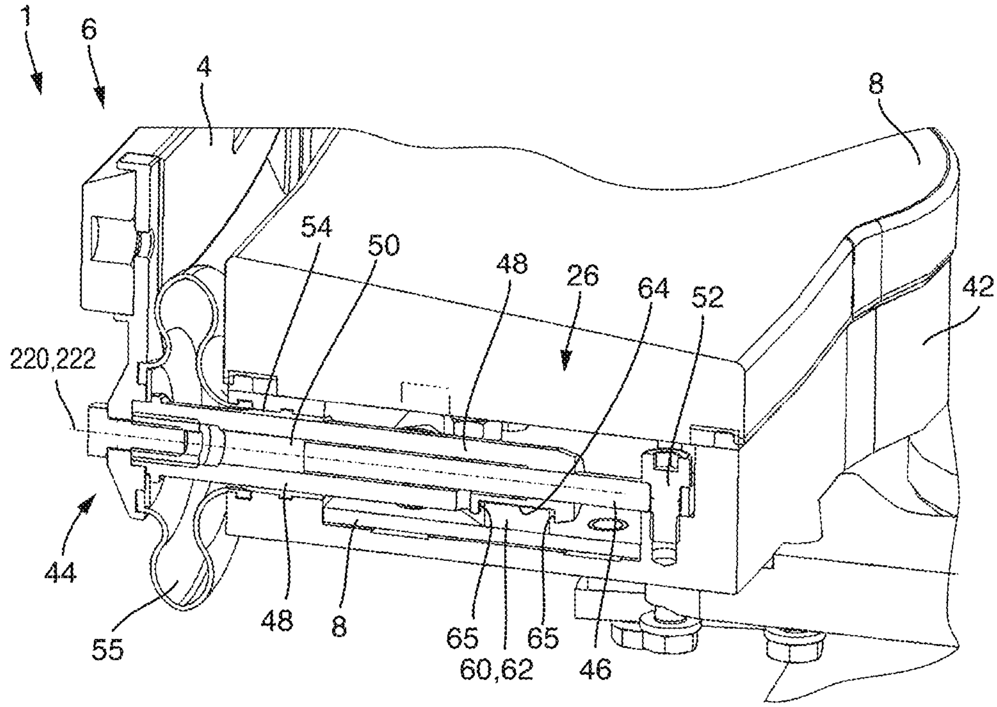
FIG. 5 schematically shows a perspectival sectional view through the apparatus of FIG. 3.

FIG. 5 schematically shows a perspectival sectional view through the apparatus 1 of FIG. 3 perpendicular to the circumferential direction 210 at the level of an adjustment part 16.

The adjustment parts 16, more specifically their fastening regions 44, to which the associated guide rail segment 4 is fastened, are mounted on a base body 42, which here constitutes a housing underside, so as to be displaceable in the radial direction 220.

For the purpose of sealing against the environment, a bellows 55 is arranged between the base body 42 and the fastening region 44.

The control segment 18 is mounted on the base body 42 so as to be displaceable in the circumferential direction 210.

According to this optional embodiment, the adjustment parts 16 are configured to be telescopic. The adjustment parts 16 each comprise a radially outer adjustment part portion 46 and a radially inner adjustment part portion 48, which are displaceable relative to one another in the radial direction 220. The corresponding guide rail segment 4 is arranged on the radially inner adjustment part portion 48. The adjustment part portions 46, 48 are configured to be non-rotatable relative to one another with respect to an axis 222 defined by the radial direction 220.

To provide non-rotatability, the radially outer adjustment part portion 46 has a polygonal cross-sectional profile. According to this example, the radially outer adjustment part portion 46 46 is a square profile beam. The radially outer adjustment part portion 46 is guided in a correspondingly shaped receptacle 50 in the radially inner adjustment part portion 48 in the radial direction 220.

The radially outer adjustment part portion 46 is firmly connected to the base body 42 on a radially outer side 52 of the adjustment part 16. The radially inner adjustment part portion 48 is guided on the radially inner side 54 of the adjustment part 16 so as to be displaceable in the radial direction 220 relative to the base body 42.

In the present case, the control segment 18 is coupled to the radially inner adjustment part portion 48 such that, by displacing the control segment 18 in the circumferential direction 210, the radially inner adjustment part portion 48 is displaced in the radial direction 20.

The adjustment parts 16 according to this embodiment and their radially inner adjustment part portions 48 are each guided on a guide element 60 arranged on the control segment 18. In this case, the guide element 60 is optionally configured as a key 62, which engages with a groove 64 provided on the radially inner adjustment part portion 48. The groove 64 comprises side surfaces 65 which are curved outwards with respect to the adjustment part 16.

Figure 6:
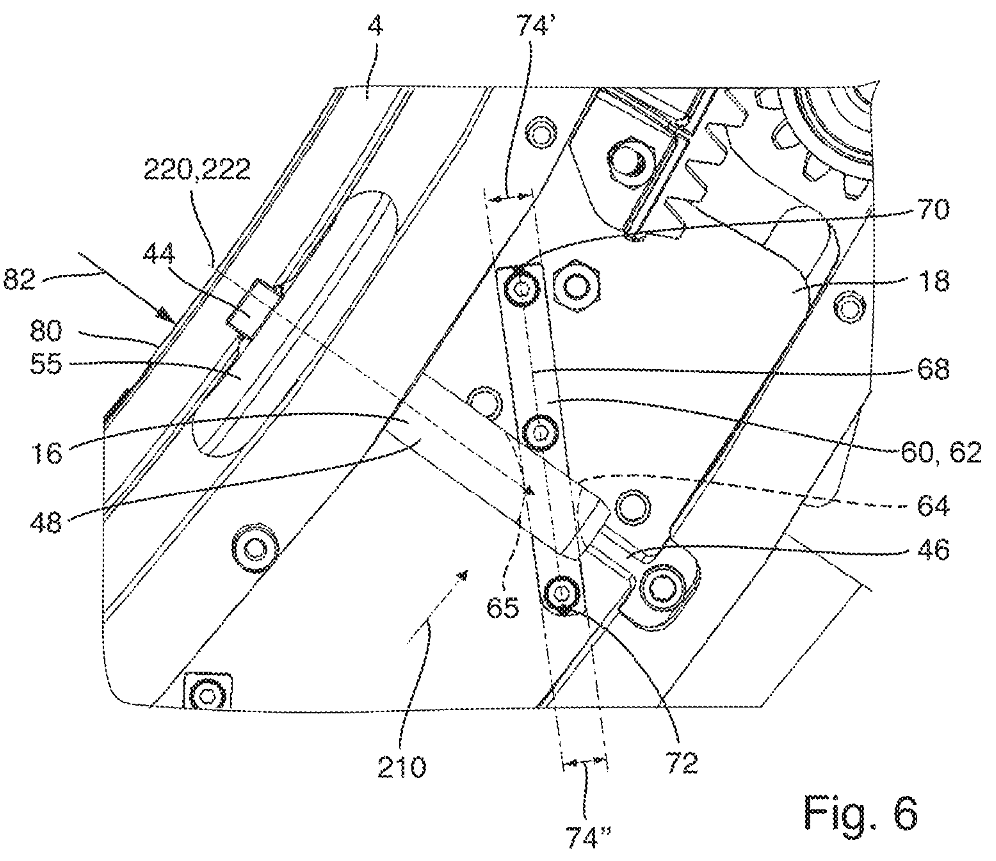
FIG. 6 schematically shows a view of an adjustment part portion of the apparatus of FIG. 5.

FIG. 6 schematically shows a view of an adjustment part 16 of the apparatus 1 of FIG. 5 in a direction parallel to the central axis 200.

The guide element 60 configured as a key 62 provides a guide curve 68 between a first point 72 located on a first radius with respect to the central axis 200 and a second point 70 located on a second radius smaller than the first radius and offset from the first point 72 in the circumferential direction 210.

The key 62 has a width 74, perpendicular to the guide curve 68, which increases from the first point 72 to the second point 70. Accordingly, the width 74' at the radially outer, first point 72 is smaller by a given amount than the width 74" of the key 62 at the radially inner, second point 70. The key 62 is optionally trapezoidal here. It can, however, also be arc-shaped.

The width 74 varying along the guide curve 68 and the outwardly curved side surfaces 65 of the groove are provided to ensure that the groove 64 and the key 62 are coupled to one another in any position of the control segment 18 relative to the adjustment part 16 so as to be substantially free of play or to not exceed a given maximum play. This is due to the changing angle formed by the axis 222 and the guide curve 68 when the control segment 18 is displaced relative to the adjustment part 16.

The guide rail segments 4 each have a given curvature on their radially inner side 80, wherein, optionally, a curvature radius 82 of the radially inner side 80 corresponds to the second radius corresponding to the radially outer position.

Figure 7:
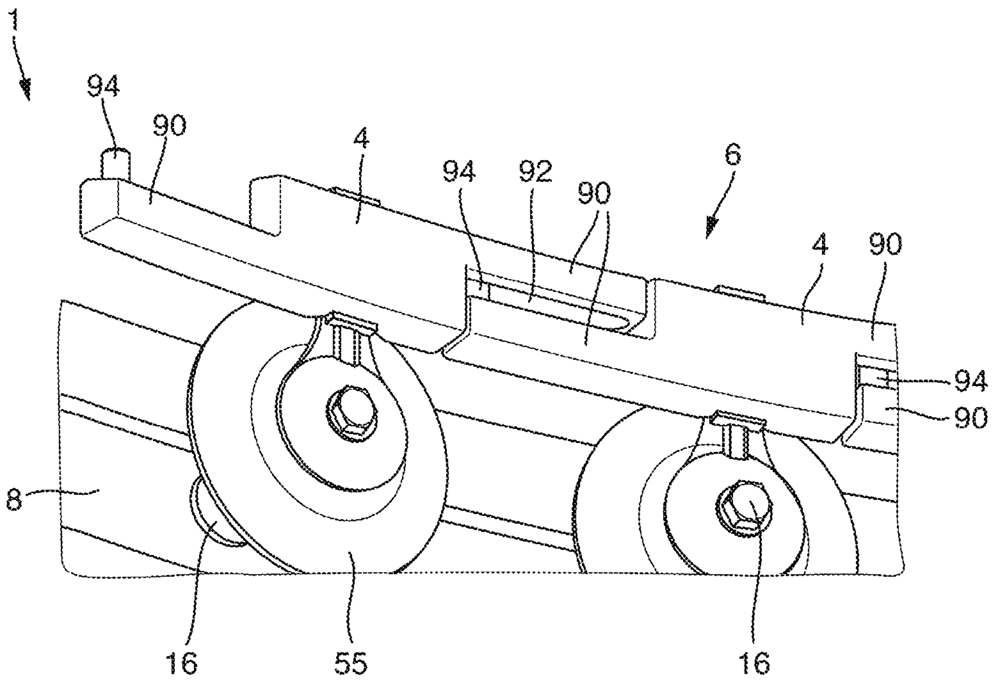
FIG. 7 schematically shows a perspectival side view of the radially inner side of a portion of the apparatus 1 of FIG. 3.

FIG. 7 schematically shows a perspectival side view of the radially inner side of a portion of the apparatus 1 of FIG. 3, by means of which coupling of the guide rail segments 4 to one another is illustrated.

As can be seen already in FIGS. 2 and 3, adjacent guide rail segments 4 overlap in the circumferential direction 210. For this purpose, each guide rail segment 4 has an overlapping section 90, on both sides in the circumferential direction 210, which at least partially overlaps with the correspondingly formed overlapping section 90 of the adjacent guide rail segment 4 in the circumferential direction 210.

Guide rail segments 4 that are adjacent to one another in the circumferential direction 210 are coupled to one another in the overlapping sections 90 so as to be displaceable in the circumferential direction 210. For this purpose, a spring element configured here as a guide pin 94 and arranged on one of the coupled guide rail segments 4 engages with a groove element configured here in the form of a slot groove 92 that is arranged on another of the coupled guide rail segments 4 and extends in the circumferential direction 210.

The guide rail segments 4 are thereby displaceable relative to one another in the circumferential direction 210, wherein, when the adjustment parts 16 are displaced in the radial direction 220, the guide rail segments 4 are displaced relative to one another in a direction parallel to the circumferential direction 210.

By coupling the guide rail segments 4 at their two ends, as viewed in the circumferential direction 210, to adjacent guide rail segments 4, it can be achieved that the ends do not protrude radially inwards with respect to the central axis 200. The segmented guide rail 6 can thereby provide guidance of the containers 101 along the conveying direction 211, essentially without the containers 101 experiencing impacts at the transitions from one guide rail segment 4 to the next guide rail segment 4.

To the extent applicable, any of the individual features set forth in the exemplary embodiments may be combined and/or interchanged, without departing from the scope of the invention.

What is claimed is:

1. An apparatus for guiding containers conveyed by a star wheel in a star wheel conveyor, comprising:

a plurality of adjustment parts spaced apart from one another in a circumferential direction relative to a central axis of rotation of the star wheel conveyor, wherein each adjustment part of the plurality of adjustment parts is displaceable in a radial direction relative to the central axis of rotation of the star wheel conveyor and the plurality of adjustment parts are configured to be telescopic;

a control segment displaceable in the circumferential direction relative to the central axis of rotation of the star wheel conveyor, wherein the control segment is coupled to the plurality of adjustment parts such that a displacement of the control segment in the circumferential direction relative to the central axis of rotation of the star wheel conveyor causes a displacement of the plurality of adjustment parts in the radial direction relative to the central axis of rotation of the star wheel conveyor; and guide rail segments each arranged at a radially inner end of each of the plurality of adjustment parts, wherein the guide rail segments together form a segmented guide rail configured to provide an outer guide track that enables the containers to be conveyed.

2. The apparatus of claim 1, wherein the guide rail segments overlap in the circumferential direction relative to the central axis of rotation of the star wheel conveyor.

3. The apparatus of claim 1, wherein by displacing the plurality of adjustment parts, the segmented guide rail is movable relative to the central axis of rotation of the star wheel conveyor between a given radially inner position and a given radially outer position.

4. The apparatus of claim 3, wherein in the given radially inner position, the segmented guide rail is disposable substantially on an inner radius with respect to the central axis of rotation of the star wheel conveyor and in the given radially outer position, the segmented guide rail is disposable substantially on an outer radius that is greater than the inner radius.

5. The apparatus of claim 3, wherein:

the guide rail segments comprise a given curvature on their radially inner side, and a curvature radius on the radially inner side corresponds to a second radius of the given radially outer position, a first radius of the given radially inner position, or a radially central position located in the center between the given radially inner position and the given radially outer position.

6. The apparatus of claim 1, wherein the guide rail segments are arranged on their associated adjustment part in a rotationally fixed manner at least about an axis defined by the radial direction relative to the central axis of rotation of the star wheel conveyor and/or are arranged in a non-displaceable manner at least in the circumferential direction relative to the central axis of rotation of the star wheel conveyor.

7. The apparatus of claim 1, wherein the guide rail segments are displaceable relative to one another in the circumferential direction relative to the central axis of rotation of the star wheel conveyor, and when the plurality of adjustment parts are displaced in the radial direction relative to the central axis of rotation of the star wheel conveyor, the guide rail segments are displaced relative to one another in a direction parallel to the circumferential direction relative to the central axis of rotation of the star wheel conveyor.

8. The apparatus of claim 1, wherein two guide rail segments of the guide rail segments adjacent in the circumferential direction relative to the central axis of rotation of the star wheel conveyor are coupled to one another to be displaceable in the circumferential direction relative to the central axis of rotation of the star wheel conveyor.

9. The apparatus of claim 8, wherein a spring element configured as a guide pin is arranged on one of the two guide rail segments and engages with a groove element configured as a slot groove that is arranged on the other guide rail segment of the two guide rail segments, and the slot groove extends in the circumferential direction relative to the central axis of rotation of the star wheel conveyor.

10. The apparatus of claim 1, wherein:

the plurality of adjustment parts are each guided on a guide element arranged on the control segment, the guide element provides a guide curve between a first point located on a first radius with respect to the central axis of rotation of the star wheel conveyor and a second point located on a second radius smaller than the first radius and offset from the first point in the circumferential direction relative to the central axis of rotation of the star wheel conveyor, and the guide element comprises a key or a guide groove.

11. The apparatus of claim 10, wherein the guide element comprises the key, and the key has a width perpendicular to the guide curve that increases from the first point to the second point.

12. The apparatus of claim 11, wherein:

the key is trapezoidal and/or arc-shaped, and/or the key engages with a corresponding groove arranged on an adjustment part, and the corresponding groove comprises side surfaces that are curved outwards with respect to the adjustment part.

13. The apparatus of claim 1, wherein:

the plurality of adjustment parts are mounted on a base body so as to be displaceable in the radial direction relative to the central axis of rotation of the star wheel conveyor, but cannot rotate about an axis defined by the radial direction relative to the central axis of rotation of the star wheel conveyor, and/or the control segment is mounted on the base body so as to be displaceable in the circumferential direction relative to the central axis of rotation of the star wheel conveyor.

14. The apparatus of claim 1, wherein:

the plurality of adjustment parts each comprise a radially outer adjustment part portion and a radially inner adjustment part portion, the radially outer adjustment part portion and the radially inner adjustment part portion are displaceable relative to one another in the radial direction relative to the central axis of rotation of the star wheel conveyor, the guide rail segments are arranged on the radially inner adjustment part portion, and by displacing the control segment in the circumferential direction relative to the central axis of rotation of the star wheel conveyor, the radially inner adjustment part portion is displaced in the radial direction relative to the central axis of rotation of the star wheel conveyor, and/or the radially outer adjustment part portion and the radially inner adjustment part portion are configured to be non-rotatable relative to one another with respect to an axis defined by the radial direction relative to the central axis of rotation of the star wheel conveyor.

15. The apparatus of claim 1, further comprising a coupling mechanism configured to couple a further apparatus arranged adjacently in the circumferential direction relative to the central axis of rotation of the star wheel conveyor that enables guiding containers conveyed by a star wheel in the star wheel conveyor.

16. The apparatus of claim 15, wherein:

the coupling mechanism is configured to couple the control segment to a further control segment of the further apparatus so that the coupled control segments are displaceable together in the circumferential direction relative to the central axis of rotation of the star wheel conveyor, the coupling mechanism comprises a first rod coupled to the control segment, with a thread of a first direction of rotation, that is coupled via a connecting nut to a second rod with a thread of a second direction of rotation that is oriented opposite to the first direction of rotation, the second rod is configured to be coupled to the control segment of the further apparatus.

17. The apparatus of claim 1, further comprising an actuating unit configured to adjust a position of the control segment relative to the plurality of adjustment parts, wherein the actuating unit and the control segment are engaged via a toothing and the actuating unit comprises a manually operated drive and/or an automatic drive.

18. The apparatus of claim 17, further comprising a height adjustment apparatus configured to adjust a height position of the apparatus, wherein the actuating unit comprises a shaft element that is displaceable relative to a drive pinion of the actuating unit along a vertically oriented axis of rotation of the drive pinion and is connected in a rotationally fixed manner to the drive pinion.

19. A star wheel conveyor for conveying containers comprising:

a conveyor wheel part rotatable about a central axis of rotation of the star wheel conveyor and comprising a plurality of pockets directed outwards with respect to the central axis of rotation of the star wheel conveyor, the plurality of pockets configured to at least partially receive a container to be conveyed, and a first apparatus that enables guiding containers conveyed by a star wheel in the star wheel conveyor, comprising:

a first plurality of adjustment parts spaced apart from one another in a circumferential direction relative to the central axis of rotation of the star wheel conveyor, wherein each adjustment part of the first plurality of adjustment parts is displaceable in a radial direction relative to the central axis of rotation of the star wheel conveyor and the first plurality of adjustment parts are configured to be telescopic;

a first control segment displaceable in the circumferential direction relative to the central axis of rotation of the star wheel conveyor, wherein the first control segment is coupled to the first plurality of adjustment parts such that displacement of the first control segment in the circumferential direction relative to the central axis of rotation of the star wheel conveyor causes a displacement of the first plurality of adjustment parts in the radial direction relative to the central axis of rotation of the star wheel conveyor; and first guide rail segments each arranged at a radially inner end of each of the first plurality of adjustment parts, wherein the first guide rail segments together form a first segmented guide rail configured to provide a first outer guide track that enables the containers to be conveyed.

20. The star wheel conveyor of claim 19, further comprising a second apparatus that enables guiding containers conveyed by the star wheel in the star wheel conveyor comprising:

a second plurality of adjustment parts spaced apart from one another in the circumferential direction relative to the central axis of rotation of the star wheel conveyor, wherein each adjustment part of the second plurality of adjustment parts is displaceable in a radial direction relative to the central axis of rotation of the star wheel conveyor;

a second control segment displaceable in the circumferential direction relative to the central axis of rotation of the star wheel conveyor, wherein the second control segment is coupled to the second plurality of adjustment parts such that displacement of the second control segment in the circumferential direction relative to the central axis of rotation of the star wheel conveyor causes a displacement of the second plurality of adjustment parts in the radial direction relative to the central axis of rotation of the star wheel conveyor; and second guide rail segments each arranged at a radially inner end of each of the second plurality of adjustment parts, wherein the second guide rail segments together form a second segmented guide rail configured to provide a second outer guide track that enables the containers to be conveyed, wherein:

the first apparatus and the second apparatus are arranged next to one another in the circumferential direction relative to the central axis of rotation of the star wheel conveyor, the first control segment and the second control segment are coupled to one another, and/or one or more of the first guide rail segments and the second guide rail segments are coupled to one another.

* * * * *